(12) United States Patent
Karaki et al.

(10) Patent No.: US 12,250,715 B2
(45) Date of Patent: Mar. 11, 2025

(54) OPERATION OF WIRELESS COMMUNICATION DEVICES IN UNLICENSED SPECTRUM FOR FRAME-BASED EQUIPMENT (FBE) NETWORKS

(71) Applicant: Telefonaktiebolaget LM Ericsson (publ), Stockholm (SE)

(72) Inventors: Reem Karaki, Aachen (DE); Sorour Falahati, Stockholm (SE); Havish Koorapaty, Saratoga, CA (US); Jung-Fu Cheng, Fremont, CA (US); Stephen Grant, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 17/767,601

(22) PCT Filed: Oct. 7, 2020

(86) PCT No.: PCT/EP2020/078116
§ 371 (c)(1),
(2) Date: Apr. 8, 2022

(87) PCT Pub. No.: WO2021/069490
PCT Pub. Date: Apr. 15, 2021

(65) Prior Publication Data
US 2023/0239917 A1 Jul. 27, 2023

Related U.S. Application Data

(60) Provisional application No. 62/913,077, filed on Oct. 9, 2019.

(51) Int. Cl.
*H04W 74/02* (2009.01)
*H04W 74/0808* (2024.01)
*H04W 74/0833* (2024.01)

(52) U.S. Cl.
CPC ....... *H04W 74/02* (2013.01); *H04W 74/0808* (2013.01); *H04W 74/0833* (2013.01)

(58) Field of Classification Search
CPC ............. H04W 74/02; H04W 74/0808; H04W 74/0833
See application file for complete search history.

(56) References Cited

U.S. PATENT DOCUMENTS

2008/0186913 A1* 8/2008 Ahn ..................... H04L 47/2433
370/329
2018/0006863 A1* 1/2018 Li ......................... H04W 72/23
(Continued)

OTHER PUBLICATIONS

Author Unknown, "5 GHz RLAN; Harmonised Standard covering the essential requirements of article 3.2 of Directive 2014/53/EU," Harmonised European Standard, EN 301.893, Version 2.1.1, May 2017, 122 pages.
(Continued)

*Primary Examiner* — Fahmida S Chowdhury
(74) *Attorney, Agent, or Firm* — Sage Patent Group

(57) ABSTRACT

Embodiments of systems and methods for operating wireless communication devices (e.g., User Equipments (UEs)) as initiating and responding devices in a Frame-Based Equipment (FBE) New Radio (NR) Unlicensed (NR-U) network are disclosed. The proposed methods allow operating the NR-U network as an FBE system in a flexible manner that supports a wide range of deployments not limited to the UE operating as a responding device. In some embodiments, methods to operate UEs as initiating and responding devices in a FBE-based NR-U network are disclosed.

17 Claims, 11 Drawing Sheets

(56) References Cited

U.S. PATENT DOCUMENTS

| | | | | |
|---|---|---|---|---|
| 2018/0070244 A1* | 3/2018 | Wu | ........................ | H04W 72/23 |
| 2019/0253976 A1* | 8/2019 | Pelletier | .............. | H04W 52/146 |
| 2020/0037354 A1* | 1/2020 | Li | ..................... | H04W 74/0808 |
| 2020/0053781 A1* | 2/2020 | Pan | ....................... | H04J 11/0069 |
| 2021/0176710 A1* | 6/2021 | Tooher | ................ | H04W 68/005 |
| 2021/0274555 A1* | 9/2021 | Alfarhan | ............... | H04W 72/23 |
| 2021/0328728 A1* | 10/2021 | El Hamss | ............. | H04L 1/1854 |

OTHER PUBLICATIONS

Author Unknown, "Technical Specification Group Radio Access Network; Study on NR-based access to unlicensed spectrum (Release 16)," Technical Report 38.889, Version 16.0.0, Dec. 2018, 3GPP Organizational Partners, 119 pages.

Author Unknown, "Technical Specification Group Radio Access Network; Physical layer procedures for shared spectrum channel access (Release 15)," Technical Specification 37.213, Version 15.2.0, Mar. 2019, 3GPP Organizational Partners, 20 pages.

Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.

Ericsson, "R1-1910947: Channel access procedures," 3GPP TSG-RAN WG1 Meeting #98Bis, Oct. 14-20, 2019, Chongqing, China, 9 pages.

Huawei et al., "R1-1910045: Coexistence and channel access for NR unlicensed band operations," 3GPP TSG RAN WG1 Meeting #98bis, Oct. 14-20, 2019, Chongqing, China, 18 pages.

Sony, "R1-1910759: Channel access for NR unlicensed operations," 3GPP TSG RAN WG1 #98bis, Oct. 14-20, 2019, Chongqing, China, 4 pages.

Vivo, "R1-1910204: Discussion on the channel access procedures," 3GPP TSG RAN WG1#98bis, Oct. 14-20, 2019, Chongqing, China, 10 pages.

International Search Report and Written Opinion for International Patent Application No. PCT/EP2020/078116, mailed Dec. 15, 2020, 13 pages.

* cited by examiner

OPERATION OF WIRELESS COMMUNICATION DEVICES IN UNLICENSED SPECTRUM FOR FRAME-BASED EQUIPMENT (FBE) NETWORKS

RELATED APPLICATIONS

This application is a 35 U.S.C. § 371 national phase filing of International Application No. PCT/EP2020/078116, filed Oct. 7, 2020, which claims the benefit of provisional patent application Ser. No. 62/913,077, filed Oct. 9, 2019, the disclosures of which are hereby incorporated herein by reference in their entireties.

TECHNICAL FIELD

The present disclosure relates to operation of frame-based wireless communications networks in unlicensed spectrum.

BACKGROUND

Mobile broadband will continue to drive the demands for big overall traffic capacity and huge achievable end-user data rates in the wireless access network. Several scenarios in the future will require data rates of up to 10 Gigabits per second (Gbps) in local areas. These demands for very high system capacity and very high end-user date rates can be met by networks with distances between access nodes ranging from a few meters in indoor deployments up to roughly 50 meters (m) in outdoor deployments, i.e. with an infrastructure density considerably higher than the densest networks of today.

Such networks are generally referred to as New Radio (NR) systems which are currently being studied in the Third Generation Partnership Project (3GPP). Besides traditional licensed exclusive bands, NR systems are also expected to operate on unlicensed bands especially for enterprise solutions. This topic is discussed in 3GPP as a work item as part of Release 16 (Rel-16).

For a node to be allowed to transmit in unlicensed spectrum, e.g. the 5 Gigahertz (GHz) band, it typically needs to perform a Clear Channel Assessment (CCA). This procedure typically includes sensing a communication medium to be idle for a number of time intervals. Sensing the medium to be idle can be done in different ways, e.g., using energy detection, preamble detection or using virtual carrier sensing. Virtual carrier sensing implies that the node reads control information from other transmitting nodes informing when a transmission ends. After sensing the medium to be idle, a node is typically allowed to transmit for a certain amount of time, sometimes referred to as Transmission Opportunity (TXOP). The length of the TXOP depends on regulation and type of CCA that has been performed, but typically ranges from 1 millisecond (ms) to 10 ms.

1 Listen Before Talk Protocol

In the harmonized standard EN 301.893, two different Listen Before Talk (LBT) procedures, frame-based LBT and load-based LBT, are specified.

1.1 Frame-Based LBT Framework

FIG. 1 is a schematic timing diagram illustrating operation of a frame-based LBT framework. The frame-based LBT framework allows an equipment to perform a CCA per Fixed Frame Period (FFP) for a duration of a single observation slot. If the channel is found to be busy after CCA operation, the equipment shall defer the FFP and shall not transmit during this FFP. If the channel is found to be available after the CCA operation, the equipment can transmit immediately up to 10 ms, where this time is referred to as the Channel Occupancy Time (COT), after which the equipment shall remain silent for at least 5% of said COT. At the end of the required idle period, the equipment can resume CCA for channel access.

The frame-based LBT protocol generally has difficulty competing with Wi-Fi, which uses Load-Based Equipment (LBE), in accessing the channel. The problems become more exacerbated with longer FFPs and higher traffic loads. Secondly, the frame-based LBT can be rather inflexible for coordinating channel access between networks as illustrated in FIG. 2.

FIG. 2 is a schematic timing diagram illustrating problems with coordinating channel access under the frame-based LBT protocol. If all the nodes are synchronized, then all nodes will find the channel available and transmit simultaneously and cause interference. If the nodes are not synchronized, then some nodes may have definitive advantages in getting access to the channel over some other nodes.

1.2 Load-Based LBT Framework

Under a load-based LBT framework, before data transmission, a node must sense the medium to be idle for a random backoff phase comprising N CCA slots, where each CCA slot is of 9 microsecond (μs) duration. N is a counter drawn randomly within a dynamic Contention Window (CW), i.e., the N idle slots do not need to be contiguous in time, and the backoff counter can be decremented after each idle CCA slot. If the energy in a CCA slot is sensed to be above the Energy Detection (ED) threshold during random backoff, then the backoff process is suspended and the counter is frozen. The backoff process is resumed and the counter can be decremented once the medium has been idle for the duration of a defer period. A defer period consists of a 16 μs silent period followed by multiple CCA slots. For example, an NR Unlicensed (NR-U) defer period of 43 μs (16+3×9 μs) is well-aligned with the Arbitration Inter-Frame Space (AIFS) of Enhanced Distribution Channel Access (EDCA) best-effort traffic.

2 Channel Access Procedure in NR-U

LBT is designed for unlicensed spectrum co-existence with other Radio Access Technologies (RATs). Both Frame-Based Equipment (FBE) and LBE are supported. As described in 3GPP Technical Report (TR) 38.889, the channel access schemes for NR-based access for unlicensed spectrum can be classified into the following categories:

Category 1: Immediate transmission after a short switching gap
  This is used for a transmitter to immediately transmit after an Uplink (UL)/Downlink (DL) switching gap inside a COT.
  The switching gap from reception to transmission is to accommodate the transceiver turnaround time and is no longer than 16 μs.
Category 2: LBT without random back-off
  The duration of time that the channel is sensed to be idle before the transmitting entity transmits is deterministic.
Category 4: LBT with random back-off with a contention window of variable size
  The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

3 COT Sharing in NR-U

The Maximum COT (MCOT) defines the maximum time allowed to share the channel among an access point and its served nodes, and is specified in certain regional regulation. MCOT limit is applicable to Wi-Fi and also adopted by NR-U. When a node, referred to as initiating node, initiates a channel occupancy by performing CCA (in both LBE and FBE systems), it is allowed to share its channel occupancy with other nodes, referred to as responding nodes. Nevertheless, gaps between transmissions of different nodes are allowed. If a gap is less than or equal 16 μs, the responding device can proceed without performing CCA. For larger gaps, an LBT based on a CCA of at least 25 μs is required prior to transmission. Most importantly, the rules require that the total channel occupancy by the initiating and responding nodes, i.e. DL and UL transmissions in case of License Assisted Access (LAA) shall not exceed the corresponding MCOT.

4 Problems with Existing Solutions

There currently exist certain challenge(s). Existing solutions have been designed assuming LBE mode of channel access. While existing solutions have many tools to allow operation of NR in FBE mode on unlicensed spectrum, without the configuration and operation methods disclosed herein, the rules for FBE mode of operation may be violated.

SUMMARY

Embodiments of systems and methods for operating wireless communication devices (e.g., User Equipments (UEs)) as initiating and responding devices in a Frame-Based Equipment (FBE) cellular communications network (e.g., an FBE New Radio (NR) Unlicensed (NR-U) network) are disclosed. The proposed methods allow operating NR-U network as an FBE system in a flexible manner that supports a wide range of deployments not limited to the UE operating as a responding device.

Certain embodiments may provide one or more of the following technical advantage(s). The proposed solution provides for improved operation of FBE cellular communications networks in unlicensed spectrum. In particular, embodiments can gain improved access to unlicensed channels while maintaining the rules for FBE operation. Embodiments may further provide improved coordination of access to unlicensed spectrum among UEs in communication with a given cellular communications network.

In some embodiments, a method performed by a wireless communication device comprises receiving, from a network node, a channel access mode indication, the channel access mode indication being an indication of whether the wireless communication device is to operate in a FBE channel access mode or a LBE channel access mode. The method further comprises determining a channel access mode in which to operate based on the channel access mode indication and operating in the determined channel access mode.

In some embodiments, the channel access mode indication is broadcast by the network node. In some embodiments, the method further comprises receiving a dedicated signal from the network node indicating the channel access mode indication, wherein the channel access mode is determined based on the dedicated signal.

In some embodiments, the determined channel access mode is the FBE channel access mode, and the method further comprises determining an FFP for the FBE channel access mode. In some embodiments, determining the FFP comprises determining the FFP based on the channel access mode indication. In some embodiments, the channel access mode indication is a joint indication of the channel access mode and, if the indicated channel access mode is the FBE channel access mode, the FFP.

In some embodiments, the channel access mode indication is a value and determining the channel access mode comprises determining that the channel access mode is the LBE channel access mode if the value is zero and determining that the channel access mode is the FBE channel access mode if the value is not zero. In some embodiments, determining the FFP comprises, if the channel access mode is the FBE channel access mode, determining the FFP based on the value of the channel access mode indication.

In some embodiments, the determined channel access mode is the FBE channel access mode, and the method further comprises determining a start of one or more FFPs for the FBE channel access mode.

In some embodiments, determining the start of the one or more FFPs for the FBE channel access mode comprises determining the start of the one or more FFPs for the FBE channel access mode implicitly.

In some embodiments, determining the start of the one or more FFPs for the FBE channel access mode implicitly comprises determining that a start of a first FFP is at a first occurrence of a System Synchronization Block (SSB) in a frame with System Frame Number (SFN)=0.

In some embodiments, determining the start of the one or more FFPs for the FBE mode implicitly comprises determining that the start of a first FFP is at a first occurrence of a System Synchronization Block (SSB) in a frame with SFN=0.

In some embodiments, determining the start of the one or more FFPs for the FBE channel access mode implicitly comprises determining that the start of a first FFP is a start of an earliest monitoring occasion within an indicated period in a Type-0 Physical Downlink (DL) Control Channel (PDCCH) Common Search Space (CSS) set where a DL Control Information (DCI) format with Cyclic Redundancy Check (CRC) scrambled by a System Information Radio Network Temporary Identifier (SI-RNTI) is received on a cell.

In some embodiments, the method further comprises receiving an indication of a start of an FFP, wherein determining the start of the one or more FFPs for the FBE channel access mode comprises determining the start of the one or more FFPs based on the received indication of the start of the FFP.

In some embodiments, receiving, from the network node, the channel access mode comprises receiving signaling having a field whose value corresponds to the start of the FFP.

In some embodiments, the determined channel access mode is the FBE channel access mode, and operating in the determined channel access mode comprises operating as a responding node by: determining whether a DL transmission is received during a particular FFP; and upon determining that the DL transmission is received during the particular FFP, transmitting a UL transmission in the particular FFP.

In some embodiments, the determined channel access mode is the FBE channel access mode, and operating in the determined channel access mode comprises operating as a responding node by: determining whether a DL transmission is detected at a start of a particular FFP; and upon determining that a DL transmission is not detected at the start of the particular FFP, not performing a UL transmission in the particular FFP. In some embodiments, the method further comprises, upon determining that a DL transmission is not detected at the start of the particular FFP, entering a sleep or idle mode In some embodiments, the determined channel access mode is the FBE channel access mode, and operating in the determined channel access mode comprises operating as an initiating node by: performing a Clear Channel Access (CCA) check on an operating channel at a start of a particular FFP; and upon a result of the CCA check being that the operating channel is clear, transmitting a UL transmission during the particular FFP.

In some embodiments, the CCA check considers the operating channel to be occupied if an energy level in the operating channel exceeds an Energy Detection (ED) threshold.

In some embodiments, the method further comprises determining the FFP based on one or more of an indication of FFP and a time domain offset, O, signaled by the network node. In some embodiments, determining the FFP comprises determining a start of a first FFP at slot O in a frame with SFN=0.

In some embodiments, operating in the determined channel access mode further comprises operating as the initiating node by calculating the FFP based on a duration of planned initiating transmissions. In some embodiments, operating in the determined channel access mode further comprises operating as the initiating node by operating with the FFP configured to the wireless communication device via a higher layer signaling by the network node.

In some embodiments, when multiple Random Access Channel, (RACH) Occasions (ROs) are configured within a Physical RACH (PRACH) configuration period, operating in the determined channel access mode further comprises operating as the initiating node by selecting one of the multiple ROs at a beginning of the FFP for a first PRACH transmission.

In some embodiments, for a second PRACH transmission, the method further comprises delaying PRACH transmission to use a same RO as the one of the multiple ROs selected as the beginning of the FFP for the first PRACH transmission. In some embodiments, for a second PRACH transmission, the method further comprises selecting a next available RO for PRACH transmission if energy above an ED threshold is not detected in a gap between the first PRACH transmission and a next PRACH occasion.

In some embodiments, operating in the determined channel access mode further comprises operating as the initiating node by starting the FFP at a UL transmission opportunity scheduled or configured by the network node. In some embodiments, the UL transmission opportunity is one or more of a Physical Uplink Shared Channel (PUSCH), a Physical Uplink Control Channel (PUCCH), a periodic Sounding Reference Signal (SRS), or a PRACH.

In some embodiments, a wireless communication device comprises processing circuitry configured to cause the wireless communication device to perform the steps of any of the above embodiments.

In some embodiments, a method performed by a network node that implements at least a part of a base station comprises transmitting or initiating transmission of a channel access mode indication to one or more wireless communication devices, the channel access mode indication being an indication of whether the one or more wireless communication devices are to operate in an FBE channel access mode or an LBE channel access mode.

In some embodiments, the channel access mode indication is a joint indication of the channel access mode and, if the indicated channel access mode is the FBE channel access mode, an FFP for the FBE channel access mode. In some embodiments, a value of zero for the channel access mode indication is an indication that the one or more wireless communication devices are to operate in the LBE channel access mode; and a non-zero value for the channel access mode indication is a joint indication that the one or more wireless communication devices are to operate in the FBE channel access mode and the FFP.

In some embodiments, the method further comprises transmitting or initiating transmission of, to at least one of the one or more wireless communication devices, an indication of a start of an FFP for the FBE channel access mode.

In some embodiments, the indicated channel access mode is the FBE channel access mode, and the method further comprises configuring or scheduling UL transmissions for the one or more wireless communication devices such that the UL transmissions align with a start of an FFP, determining whether a UL transmission is detected at a start of a particular FFP, and, upon determining that a UL transmission is detected at the start of the particular FFP, transmitting a DL transmission in the particular FFP.

In some embodiments, scheduling a scheduled UL transmission comprises scheduling the scheduled UL transmission so that a start of the scheduled UL transmission coincides with a start of a configured grant UL transmission opportunity and the start of the FFP.

In some embodiments, the method further comprises: configuring a PRACH with multiple ROs; and aligning a FFP for the FBE channel access mode with the configured PRACH such that at least one of the multiple ROs is at the start of the FFP.

In some embodiments, a network node comprises processing circuitry configured to cause the network node to perform the steps of any of the above embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
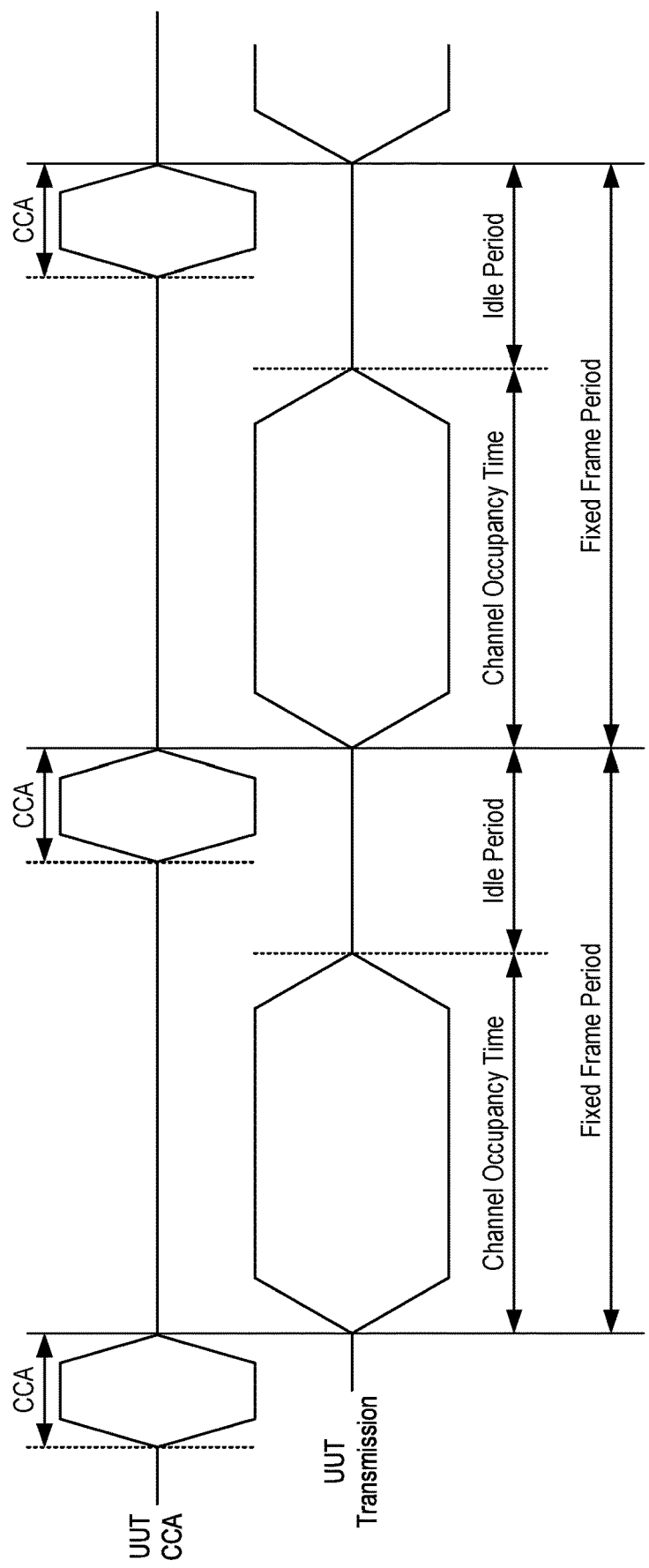
FIG. 1 is a schematic timing diagram illustrating operation of a frame-based Listen Before Talk (LBT) framework.
Figure 2:
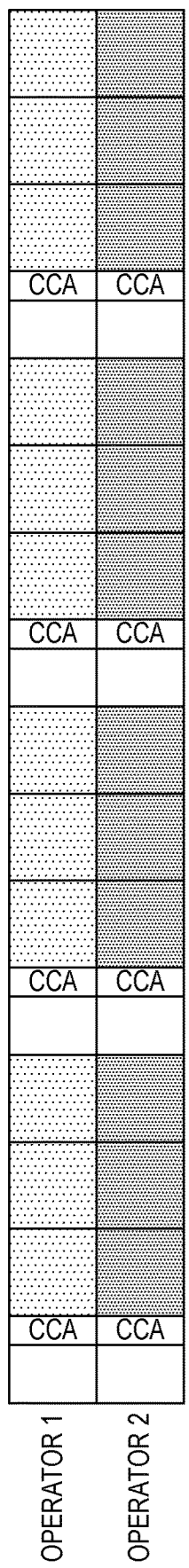
FIG. 2 is a schematic timing diagram illustrating problems with coordinating channel access under the frame-based LBT protocol.
Figure 2:
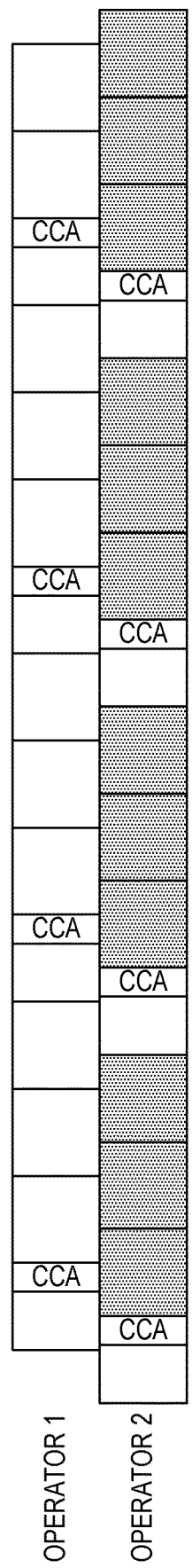

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Embodiments of systems and methods for operating wireless communication devices (e.g., UEs) as initiating and responding devices in a Frame-Based Equipment (FBE) NR Unlicensed (NR-U) network are disclosed. The proposed methods allow operating NR-U network as an FBE system in a flexible manner that supports a wide range of deployments not limited to the UE operating as a responding device.

Certain embodiments may provide one or more of the following technical advantage(s). The proposed solution provides for improved operation of FBE cellular communications networks in unlicensed spectrum. In particular, embodiments can gain improved access to unlicensed channels while maintaining the rules for FBE operation. Embodiments may further provide improved coordination of access to unlicensed spectrum among UEs in communication with a given cellular communications network.

Embodiments disclosed herein include one or more of the following:

UE behavior when operating as a responding device in an FBE-based NR-U network;

UE behavior when a UE can operate as both initiating and responding device in an FBE-based NR-U network;

Next Generation (NG) or gNB behavior when it operates as a responding device;

configurations of Uplink (UL) transmissions by higher layers to be able to operate in an FBE network as responding devices, initiating devices, or both;

multiplexing of scheduled and configured UL transmissions to occur at the same time to ensure efficient operation as an FBE system;

modes of operation without the need to signal the Fixed Frame Period (FFP); and modes of operation when the FFP is signaled.

Figure 3:
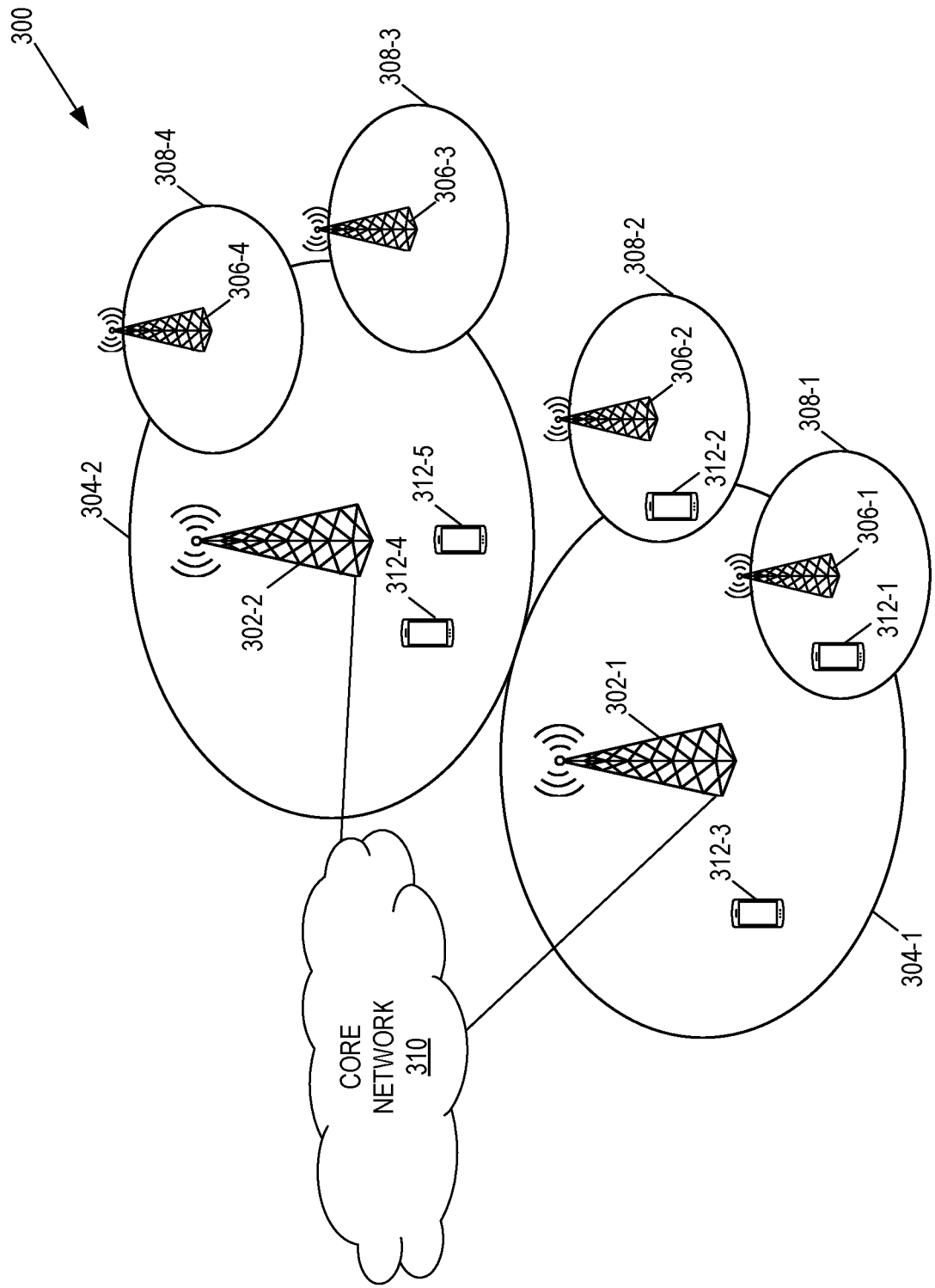
FIG. 3 illustrates one example of a cellular communications system in which embodiments of the present disclosure may be implemented.

In this regard, FIG. 3 illustrates one example of a cellular communications system 300 in which embodiments of the present disclosure may be implemented. In the embodiments described herein, the cellular communications system 300 is a 5G System (5GS) including a NR RAN (also referred to as a NG-RAN). In this example, the RAN includes base stations 302-1 and 302-2, which in 5G NR are referred to as gNBs or ng-eNBs (e.g., LTE RAN nodes connected to 5G Core (5GC)), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304.

The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5GC. The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

In the embodiments disclosed herein, the base stations 302, or at least some of the base stations 302, are NR-U gNBs (i.e., gNBs that serve cells in unlicensed spectrum in accordance with NR-U).

Now, a description of a number of embodiments will be provided. Note that while these embodiments are sometimes described under separate headings, these embodiments may be used in any desired combination.

Embodiment 1

In this embodiment, a parameter (FFP indication) is used to indicate if the network is operating as FBE or Load-Based Equipment (LBE) system. The FFP is derived from the same parameter. In one example embodiment:

if FFP indication=0, the channel access mode is LBE;

otherwise, if FFP indication>0, it explicitly indicates the FFP, e.g., 1 ms, 2 ms, . . . , 10 ms.

In one embodiment, the FFP indication indicates the FFP in units of one of the following:

millisecond (ms);

number of symbols; or number of slots.

Note, however, that the FFP indication may indicate the FFP in other units of time.

In one aspect of this embodiment, the FFP indication is provided in system information carried in one of the System Information Blocks (SIBs) which is broadcast to multiple UEs in the cell. The FFP could in addition be also modified via dedicated signaling (e.g., dedicated Radio Resource Control (RRC) signaling) that is delivered UE-specifically.

Embodiment 2

In this embodiment, the UE implicitly considers that the first FFP starts at the first symbol of the first slot of System Frame Number (SFN)=0 and recurs according to a periodicity (i.e. FFP). As a non-limiting example, if the FFP indication indicates 10 slots, then slots 0, 10, 20, etc. mark the start of the FFP.

Other starting positions in the frame structure of NR may also be used. The following are some non-limiting examples:

In one example embodiment, the UE implicitly considers that the FFP starts at the first occurrence of a System Synchronization Block (SSB) in frame with SFN=0.

In another example embodiment, the UE implicitly considers that the FFP starts at the start of the earliest monitoring occasion in a Type-0 Physical Downlink (DL) Control Channel (PDCCH) Common Search Space (CSS) set where a DL Control Information (DCI) format with Cyclic Redundancy Check (CRC) scrambled by a System Information Radio Network Temporary Identifier (SI-RNTI) is received on a cell.

In some embodiments, the start point of the FFP may be indicated along with the FFP. For example, the start point may be indicated by a field whose values correspond to any of the start points in the non-limiting examples above or to any other starting points.

In some embodiments, the start point of the FFP may also be directly indicated using a field whose values directly correspond to the number of symbols after the start of the frame with SFN=0 where the FFP starts. The units for this field could alternately be slots so that the start of the frame is signaled as a number of slots after the start of the frame with SFN=0.

Note that, in some embodiments, Embodiment 2 may be combined with Embodiment 1. However, Embodiment 2 may alternatively be used without Embodiment 1 (e.g., in the case of some other explicit or implicit indication of FBE mode and FFP).

Embodiment 3

In this embodiment, the UEs operate as responding devices. The UE is allowed to perform UL transmissions (scheduled or configured) if the gNB initiated the Channel Occupancy Time (COT) within the same FFP as the intended UL transmission.

As long as the UE is not configured with UE specific FFP parameters, the UE operates solely as a responding device.

Assuming that the FFP is signaled to the UE, the UE may derive the start and end of every FFP. Accordingly, if the UE detects a DL transmission within the cycle, it may perform the configured/scheduled UL transmission. Otherwise, the UE refrains from transmitting within that cycle.

As one aspect of this embodiment, the UL transmission within an FFP is conditioned on the detection of any DL transmission from the serving node within the same FFP (at the beginning or any time within the FFP before the scheduled/configured UL transmission). Such transmissions could include broadcast, group common and dedicated control channels, any data channels and any reference signals such as SSB, Demodulation Reference Signal (DMRS), Tracking Reference Signal (TRS), and the Channel State Information Reference Signal (CSI-RS).

As another aspect of this embodiment, the UL transmission within a cycle is conditioned on the detection of SSB transmission from the serving node within the same cycle.

As another aspect of this embodiment, the UL transmission within a cycle is conditioned on the detection of a control signal from the serving node within the same cycle (at the beginning or any time within the cycle before the scheduled/configured UL transmission). Non-limiting examples of such signals are:
UE-specific PDCCH addressed to the UE;
Group Common PDCCHs (GC-PDCCHs) addressed to a group of UEs; and
broadcast PDCCH addressed to all or a subset of the UEs, e.g., PDCCH for a type-0 search space scheduling a Physical Downlink Shared Channel (PDSCH) carrying system information.

As another aspect of this embodiment, the UL transmission within a cycle is conditioned on the detection of any signal with a CRC such as a PDCCH or PDSCH.

Note that, in some embodiments, Embodiment 3 may be combined with Embodiment 1 and/or Embodiment 2. However, Embodiment 3 may alternatively be used without Embodiment 1 (e.g., in the case of some other explicit or implicit indication of FBE mode and FFP) and/or without Embodiment 2 (e.g., in the case of some other way of determining the start of the FFP).

Embodiment 3A

In one embodiment, UL transmissions on resources configured by higher layers only occur if the UE receives a GC-PDCCH with DCI format 2_0 indicating that the configured symbols for the transmission are designated as 'U', i.e., as UL symbols.

In one embodiment, the UE only transmits on these symbols if the GC-PDCCH indicating them as UL symbols occurs within the same FFP which is signaled to the UE.

In another embodiment, the GC-PDCCH indicating the configured UL symbols as UL does not have to occur in the same FFP. But, the UE only transmits on these resources if some DL signal/channel is detected within the FFP which must be signaled to the UE. In another embodiment, the UE does not have to check that the GC-PDCCH signaling the configured UL symbols as UL symbols occurred in the same FFP. The UE assumes that the gNB will ensure by appropriate configuration of DCI format 2_0 (which delivers the GC-PDCCH) monitoring periodicities that it has initiated a channel occupancy in the FFP whenever such indication is provided. In this case, the FFP does not have to be signaled to the UE.

Note that, in some embodiments, Embodiment 3A may be combined with Embodiment 1, Embodiment 2, and/or Embodiment 3. However, Embodiment 3A may alternatively be used without Embodiment 1 (e.g., in the case of some other explicit or implicit indication of FBE mode and FFP) and/or without Embodiment 2 (e.g., in the case of some other way of determining the start of the FFP) and/or without Embodiment 3.

Embodiment 4

The UE may operate as an initiating or responding device.

The gNB configures the UE's FFP parameter using higher layer signaling. The signaling is either UE specific (e.g., via RRC configuration) or common among a set of UEs (e.g., via RRC or SIB1 signaling).

The FFP parameters signaled to the UE include one or more of the following:
FFP (e.g., duration); or
time domain offset (O, in slots). In some embodiments, the UE considers that the first FFP starts at the first symbol of slot "O" in SFN=0 and recurs according with priority FFP.

In this case, the UE has two options to perform UL transmission:
It operates as a responding node within a gNB-initiated COT. In this case, the conditions in Embodiment 3 should be fulfilled.
It operates as an initiating node. In some embodiments, immediately before starting transmissions on an operating channel at the start of an FFP, the UE performs a Clear Channel Assessment (CCA) check during a single observation period. The operating channel is considered occupied if the energy level in the channel exceeds the Energy Detection (ED) threshold level. If the UE finds the operating channel(s) to be clear, it may transmit immediately.

As another aspect of this embodiment, the gNB aligns the UE cycle with the Random Access Channel (RACH) occasions. That means that at least one RACH occasion is at the start of an FFP.

In another aspect of this embodiment, the gNB configures all configured UL transmission occasions including RACH such that all the occasions coincide with the start of an FFP.

Note that, in some embodiments, Embodiment 4 may be combined with Embodiment 1, Embodiment 2, Embodiment 3, and/or Embodiment 3A. However, Embodiment 4 may alternatively be used without Embodiment 1, Embodiment 2 Embodiment 3, and/or Embodiment 3A.

Embodiment 4A

In one embodiment, when a UE operates as an initiating device, an FFP parameter (e.g., FFP duration) is calculated based on the duration of planned initiating transmissions. The calculated FFP parameter is large enough to contain both the planned transmission and the regulatorily required 5% quiet period. The configuration of the FFP parameter based on the length of Physical RACH (PRACH) transmissions may be performed by the gNB or the FFP desired may be determined by the UE and communicated to the gNB.

As one non-limiting example, the UE plans to transmit PRACHs that have a length that is more than 12 symbols. The FFP of one slot (containing 14 symbols) is calculated so that it will be large enough to contain both the planned transmission and the regulatorily required 5% quiet period. Before the planned PRACH opportunity, the UE performs a CCA check for an observation period to check whether the operating channel is clear or not. When a UE does not plan to initiate a transmission for a UE FFP, the UE is not required to perform the CCA check.

Note that, in some embodiments, Embodiment 4A may be combined with Embodiment 1, Embodiment 2, Embodiment 3, Embodiment 3A, and/or Embodiment 4. However, Embodiment 4A may alternatively be used without Embodiment 1, Embodiment 2 Embodiment 3, Embodiment 3A, and/or Embodiment 4.

Embodiment 4B

Figure 4:
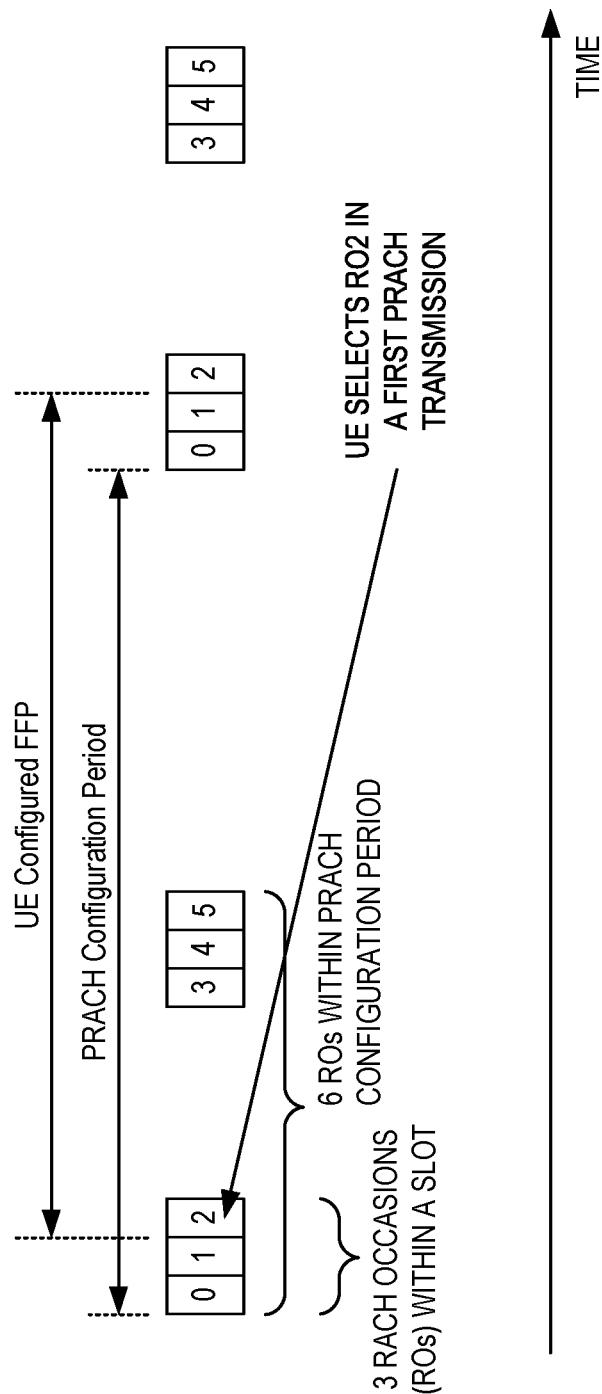
FIG. 4 is a timing diagram illustrating a Physical Random Access Channel (PRACH) configuration aligned with a Fixed Frame Period (FFP) according to some embodiments.

Since there are rules about how often the FFP can be modified, this embodiment offers a method for the UE, acting as an initiating device, to always start PRACH transmissions at the beginning of the FFP for the case when there are multiple RACH Occasions (ROs) within a PRACH configuration period (see non-limiting example in FIG. 4).

FIG. 4 is a timing diagram illustrating a PRACH configuration aligned with an FFP according to at least some aspects of embodiment 4. The example of FIG. 4 shows that there are 6 ROs within the PRACH configuration period, and for a first PRACH transmission, the UE selects RO2 according to Rel-15 behavior. For a second PRACH transmission, later in time, the UE does one of the following:

- It modifies its behavior for RO selection. Rather than selecting the first available RO, it delays its PRACH transmission such that it uses the same RO as the first PRACH transmission.
- It selects the next available RO if it does not detect any energy on the carrier above the energy detection threshold in the gap between the first PRACH transmission and the next PRACH occasion and in the CCA slot immediately prior to the next RO.

This embodiment is further delineated below:

Embodiment 4B-1: The method of embodiment 4B in which the RACH configuration consists of more than one RACH occasion within a PRACH configuration period, wherein:
- The FFP is selected to have equal duration to the PRACH configuration period and to be aligned with the selected RO.
  - This selection may be done by the gNB and configured to the UE via higher layer signaling or it may be done by the UE and communicated to the gNB.
- The UE selects an RO for a first PRACH transmission according to existing Rel-15 behavior with the constraint that it is aligned with the start of the FFP.
- For a second PRACH transmission, later in time, the UE either:
  - delays its PRACH transmission such that it uses the same RO as the first PRACH transmission at the start of the next FFP; or
  - selects the next available RO if it does not detect any energy on the carrier above the energy detection threshold in the gap between the first PRACH transmission and the next PRACH occasion and in the CCA slot immediately prior to the next RO.

Embodiment 4B-2: The method of embodiment 4B-1 in which all System Synchronization (SS)/Physical Broadcast Channel (PBCH) blocks transmitted by the gNB are mapped to all ROs.

Embodiment 4B-3: The method of embodiment 4B-1 wherein if the UE delays its PRACH transmission, it first checks if the currently preferred SS/PBCH block is mapped to the same RO as the first PRACH transmission, and
- if it is mapped, the UE transmits PRACH;
- if it is not mapped, the UE delays PRACH transmission longer, e.g., until a RACH occasion becomes available where one of the following holds:
  - the UE can transmit in a gNB initiated channel occupancy;
  - the UE can transmit in another UE initiated channel occupancy after performing CCA successfully so that it may continue transmissions within the frame period; or
  - the UE in coordination with the gNB is able to re-configure the FFP to align with a new RO.

Note that, in some embodiments, Embodiment 4B may be combined with Embodiment 1, Embodiment 2, Embodiment 3, Embodiment 3A, Embodiment 4, and/or Embodiment 4A. However, Embodiment 4B may alternatively be used without Embodiment 1, Embodiment 2 Embodiment 3, Embodiment 3A, Embodiment 4, and/or Embodiment 4A.

Embodiment 5

In this embodiment, the UE operates as an initiating device and may or may not in addition operate as a responding device.

The gNB configures UL transmission opportunities (e.g., by RRC signaling) for Physical Uplink Control Channel (PUCCH) (carrying scheduling requests or SR), configured grant Physical Uplink Shared Channel (PUSCH), periodic Sounding Reference Signal (SRS), and/or PRACH so that they align with the start of the FFP.

The gNB schedules scheduled UL transmissions (PUSCH/PUCCH carrying Hybrid Automated Repeat Request (HARQ) Acknowledgement (ACK) (HARQ-ACK), triggered CSI reports, etc.) whose timing is controlled fully by the gNB to also coincide with the start of FFPs where configured UL transmission opportunities may be present.

Figure 5:
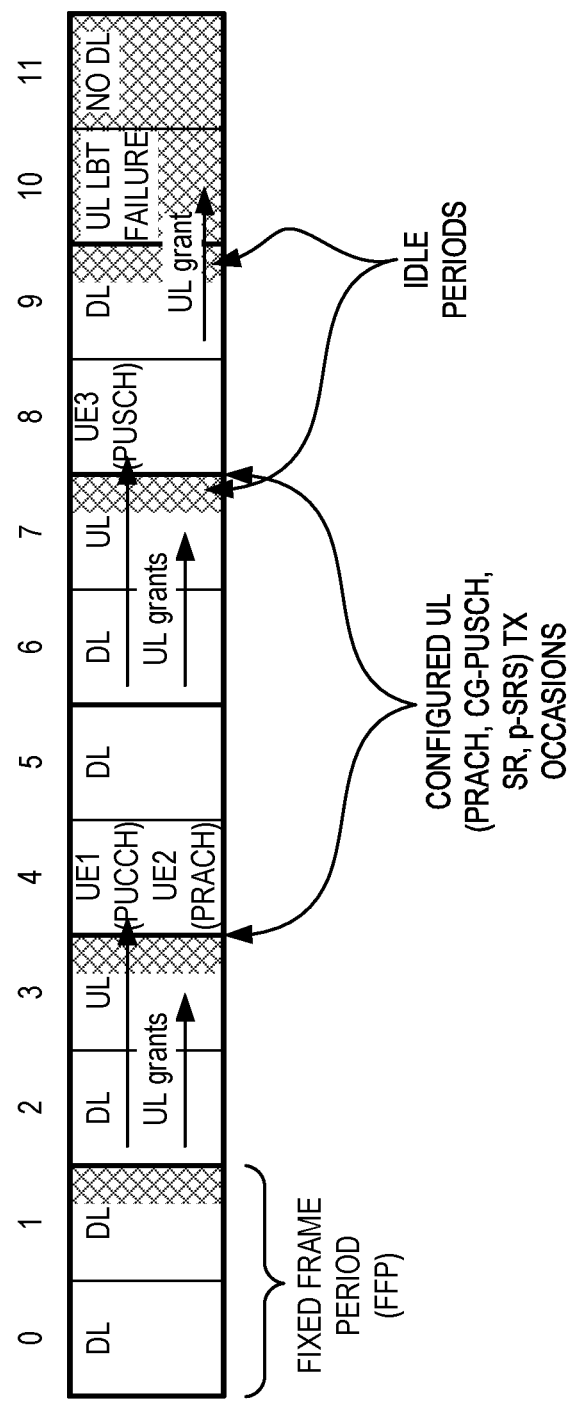
FIG. 5 shows New Radio (NR) operation in Frame-Based Equipment (FBE) channel access mode where signaling of FFP to a User Equipment (UE) is not necessary.

The gNB transmits within an FFP where a UE initiates a UL channel occupancy by transmitting at the start of the FFP if it successfully detects a transmission by a UE. FIG. 5 shows a non-limiting example of how the above elements of this embodiment can be used to operate NR in FBE mode with or without the signaling of the FFP to UEs. In particular, FIG. 5 shows NR operation in FBE mode where signaling of FFP to the UE is not necessary. In this example, the FFP is set to a period of 1 ms which is the same duration as two 0.5 ms slots when NR operates with a subcarrier spacing of 30 kHz. UEs operate as initiating devices for transmissions in slot 4 and slot 8, i.e., at the beginning of the FFP but as responding devices for transmissions in slots 3 and 7. The gNB can transmit on the DL in slots 5 and 9 after successful CCA and transmissions by UEs acting as initiating devices in slots 4 and 8 respectively. But, the gNB cannot transmit in slot 11 since it fails to detect a UL transmission in slot 10 where the UE failed LBT. In slot 4, the UE is signaled to provide HARQ-ACK for PUCCH for the DL transmission in slot 2 and in slot 8; the UE is scheduled to transmit UL PUSCH by a PDCCH in slot 6. Both of these scheduled transmissions are frequency multiplexed with resources allocated by higher layers for configured UL transmissions so that at least one UE is guaranteed to attempt transmission. If this transmission succeeds, then the gNB can share the channel occupancy and use the remainder of the FFP for DL transmissions as a responding device.

Note that, in some embodiments, Embodiment 5 may be combined with Embodiment 1, Embodiment 2, Embodiment 3, Embodiment 3A, Embodiment 4, Embodiment 4A, and/or Embodiment 4B. However, Embodiment 5 may alternatively be used without Embodiment 1, Embodiment 2 Embodiment 3, Embodiment 3A, Embodiment 4, Embodiment 4A, and/or Embodiment 4B.

Embodiment 6

In this embodiment, when the UE operates in an FFP as a responding device, the UE goes to sleep and doesn't monitor for any gNB transmissions in the FFP if transmissions from the gNB are not detected at the beginning of the FFP.

Note that, in some embodiments, Embodiment 6 may be combined with Embodiment 1, Embodiment 2, Embodiment 3, Embodiment 3A, Embodiment 4, Embodiment 4A, Embodiment 4B, and/or Embodiment 5. However, Embodiment 6 may alternatively be used without Embodiment 1, Embodiment 2 Embodiment 3, Embodiment 3A, Embodiment 4, Embodiment 4A, Embodiment 4B, and/or Embodiment 5.

The remaining description is applicable to all of Embodiments 1-6 above.

Figure 6:
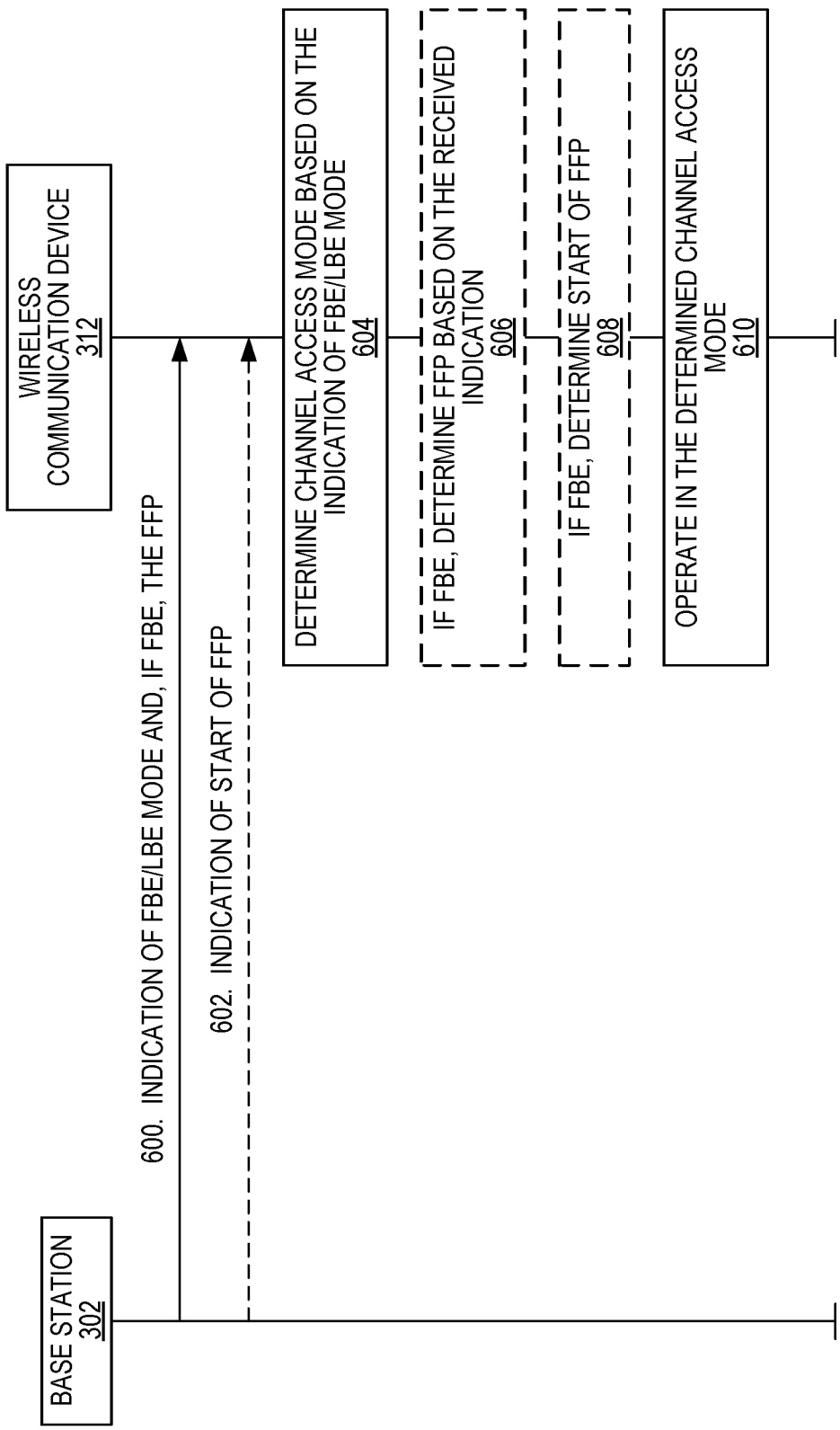
FIG. 6 illustrates the operation of a wireless communication device and a base station in accordance with at least some aspects of embodiments described herein.

FIG. 6 illustrates the operation of a wireless communication device 312 (e.g., a UE) and a base station 302 (e.g., a gNB) in accordance with at least some aspects of the embodiments described above. Optional steps are represented by dashed lines or dashed boxes. Note that this process is only an example. It should also be noted that while the base station 302 (e.g., gNB) is illustrated as a single box or element, depending on the particular implementation, the base station 302 (e.g., gNB) may be implemented as a single network node or may be distributed across two or more network nodes. For example, the base station 302 may be implemented as two separate network nodes, namely, a first network node that implements e.g., the Physical Layer (PHY) and at least a portion of the Medium Access Control (MAC) layer and a second network node that implements higher layers and possibly at portion of the MAC layer.

As a specific example, in the case of a gNB, the functionality of the gNB may be separated between a gNB Centralized Unit (gNB-CU) and one or more gNB Distributed Units (gNB-DUs). In this regard, steps or functions described herein as being performed by the base station 302 or gNB may be performed in a distributed manner. For example, a network node that implements the higher layer functionality may "initiate" transmission of a particular message (e.g., by sending the message to another network node that implements the lower layer(s)), thereby causing the other network node that implements the lower layer functionality to actually transmit the particular message.

As illustrated, the base station 302 transmits (e.g., via broadcast or dedicated signaling), to the wireless communication device 312, an indication of FBE or LBE channel access mode and, if FBE, the FFP (step 600). As discussed above (e.g., in Embodiment 1), this indication is an FFP indication that jointly indicates the FBE/LBE channel access mode and, if FBE, the FFP. In addition, in some embodiments, the base station 302 transmits (e.g., via broadcast or dedicated signaling), an indication of the start of the FFP (e.g., as described above with respect to Embodiment 2 or Embodiment 4 (time domain offset)) (step 602). Alternatively, the start of the FFP is determined implicitly (e.g., as described above with respect to Embodiment 2).

At the wireless communication device 312, the wireless communication device 312 receives the indication of step 600 and, optionally, the indication of the start of the FFP in step 602. The wireless communication device 312 determines whether to operate in the FBE channel access mode or the LBE channel access mode based on the indication received in step 600 (step 604). In addition, if the determined channel access mode is the FBE channel access mode, the wireless communication device 312 determines the FFP from the indication received in step 600, as described above (e.g., in Embodiment 1) (step 606) and determines the start of the FFP (e.g., as described above with respect to Embodiment 2) (step 608). The wireless communication device 312 then operates in the determined channel access mode (step 610). Embodiments 3-6 provide details of how the wireless communication device 312 may operate when operating in the FBE channel access mode. Those details are applicable here for the case where the determined channel access mode is the FBE channel access mode.

Figure 7:
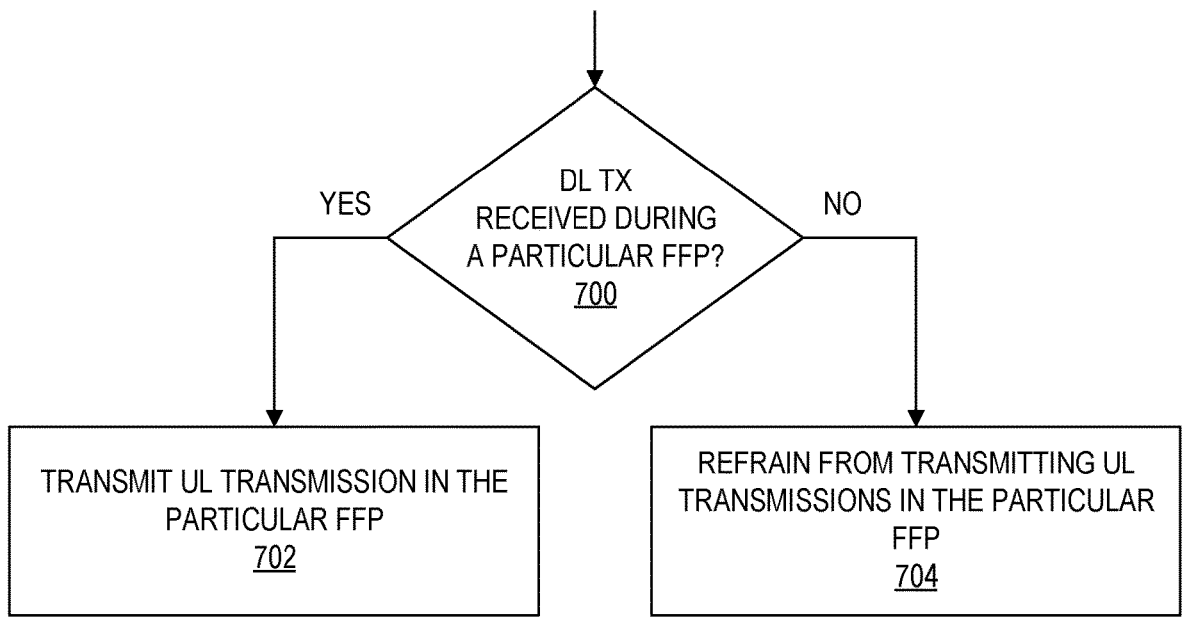
FIG. 7 illustrates the operation of a wireless communication device in the FBE channel access mode in accordance with at least some aspects of embodiments described herein.

FIG. 7 illustrates the operation of a wireless communication device 312 in the FBE channel access mode in accordance with at least some aspects of Embodiments 3 and 3A above. This process may be performed as part of step 610 of FIG. 6, but is not limited thereto. As illustrated, when operating in the FBE channel access mode, the wireless communication device 312 determines whether a DL transmission from the base station 312 is received within a particular FFP (step 700). In some embodiments, this DL transmission is any DL transmission from the base station 312. In some other embodiments, this DL transmission is a transmission of a particular DL signal (e.g., a SSB, a UE-specific PDCCH addressed to the wireless communication device 312, a GC-PDCCH(s) addressed to a group of wireless communication devices (e.g., including the wireless communication device 312), a broadcast PDCCH addressed to all or a subset of the wireless communication devices) or a particular DL channel. In some other embodiments, this DL transmission is one of a set of particular DL signals (e.g., any signal with a CRC such as a PDCCH or PDSCH) or one of a set of particular DL channels. If so, the wireless communication device 312 determines that it is permitted to transmit a configured or scheduled UL transmission within the particular FFP and, as such, the wireless communication device 312 transmits the configured or scheduled UL transmission within the particular FFP (step 702). Otherwise, the wireless communication device 312 determines that it is not permitted to transmit a configured or scheduled UL transmission within the particular FFP and, as such, the wireless communication device 312 refrains from transmitting the configured or scheduled UL transmission within the particular FFP (step 704).

Figure 8:
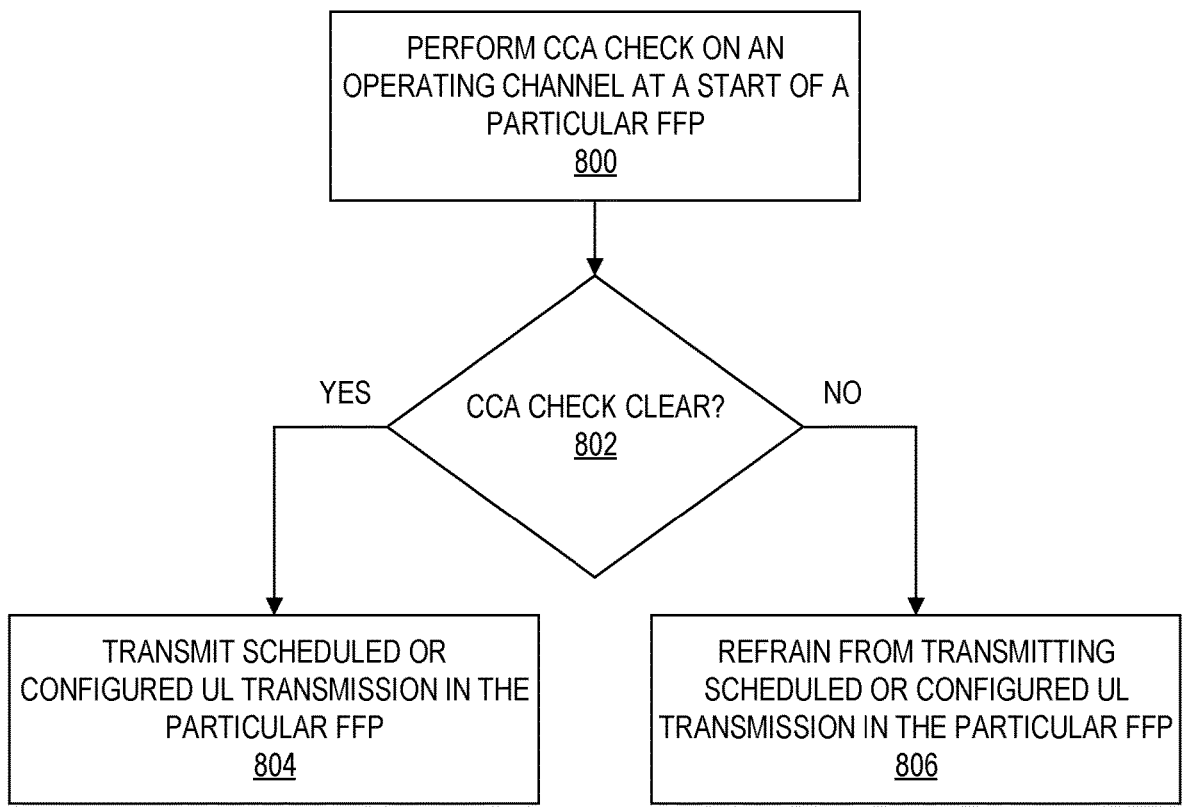
FIG. 8 illustrates the operation of a wireless communication device in the FBE channel access mode in accordance with at least some aspects of embodiments described herein.

FIG. 8 illustrates the operation of a wireless communication device 312 in the FBE channel access mode in accordance with at least some aspects of Embodiments 4, 4A, and 4B above. This process may be performed as part of step 610 of FIG. 6, but is not limited thereto. As illustrated, when operating in the FBE channel access mode as the initiating node, the wireless communication device 312 performs a CCA check (e.g., during a single observation period) immediately before starting transmissions on an operating channel at the start of a particular FFP (e.g., just before the start of the particular FFP) (step 800). If the operating channel is clear (step 802, YES), the wireless communication device 312 transmits a UL transmission (e.g., starting immediately at the start of the particular FFP)

(step 804). Otherwise, if the CCA check is not clear (step 802, NO), the wireless communication device 312 refrains from transmitting in the particular FFP (step 806).

Figure 9:
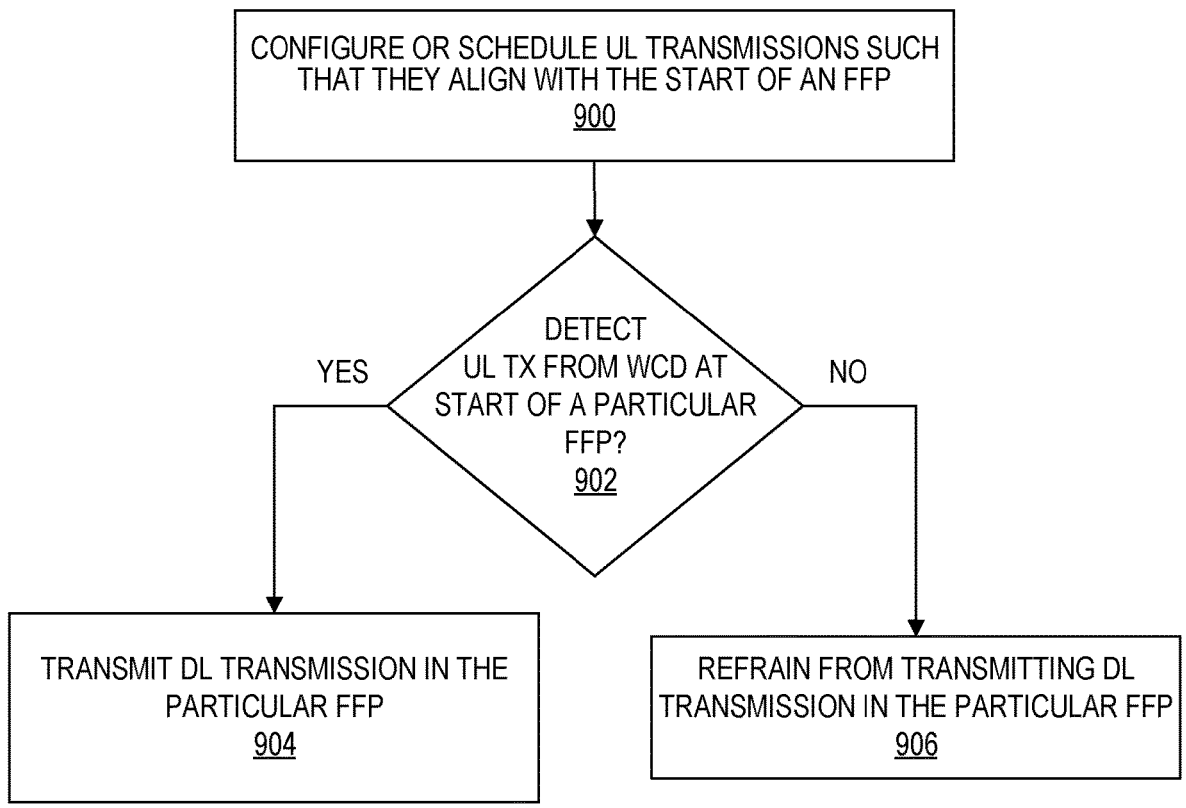
FIG. 9 illustrates the operation of a base station in the FBE channel access mode in accordance with at least some aspects of embodiments described herein.

FIG. 9 illustrates the operation of a base station 302 (e.g., gNB) in the FBE channel access mode in accordance with at least some aspects of Embodiment 5 above. As illustrated, when operating in the FBE channel access mode as a responding node, the base station 302 configures or schedules UL transmissions by a wireless communication device 312 (and potentially additional wireless communication devices) such that these UL transmissions align with the start of an FFP (step 900). The base station 302 determines whether a UL transmission from a wireless communication device 312 is detected at a start of a particular FFP (step 902). If so, the base station 302 transmits a DL transmission(s) in the particular FFP (step 904). Otherwise, the base station 302 refrains from transmitting in the particular FFP (step 906).

Figure 10:
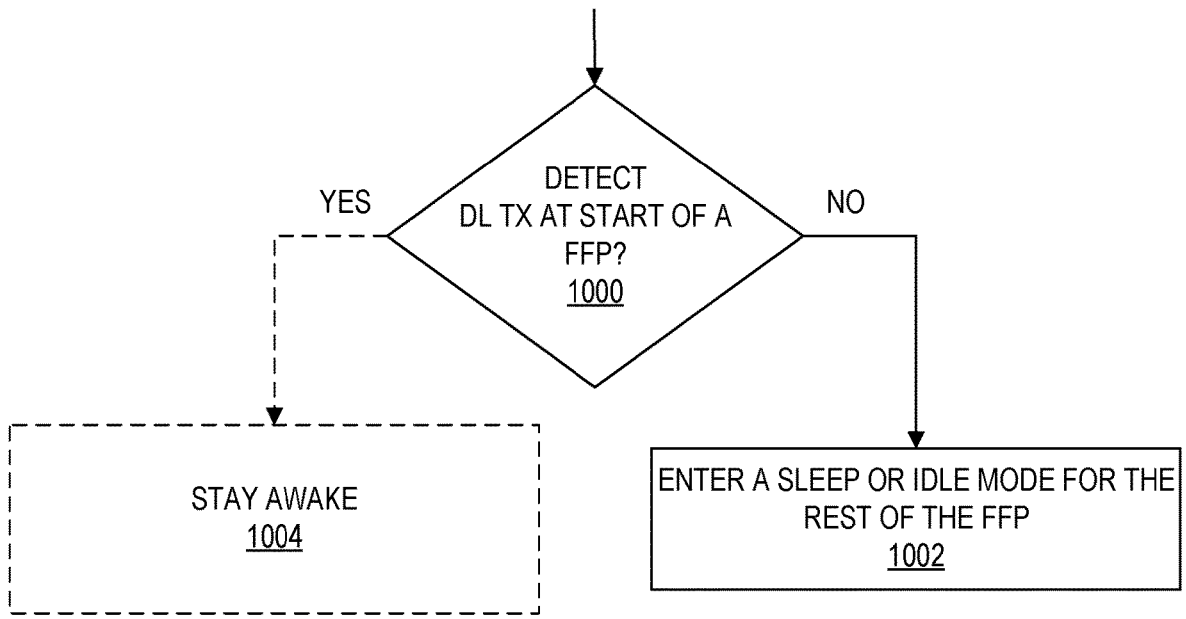
FIG. 10 illustrates the operation of a wireless communication device in the FBE channel access mode in accordance with at least some aspects of embodiments described herein.

FIG. 10 illustrates the operation of a wireless communication device 312 in the FBE channel access mode in accordance with at least some aspects of Embodiment 6. This process may be performed as part of step 610 of FIG. 6, but is not limited thereto. As illustrated, when operating in the FBE channel access mode, the wireless communication device 312 determines whether a DL transmission is detected at the start of a particular FFP (step 1000). If not, the wireless communication device 312 enters a sleep or idle mode for the remainder of the particular FFP (step 1002). Otherwise, the wireless communication device 312 stays awake (e.g., continues to monitor for DL transmissions) (step 1004).

Figure 11:
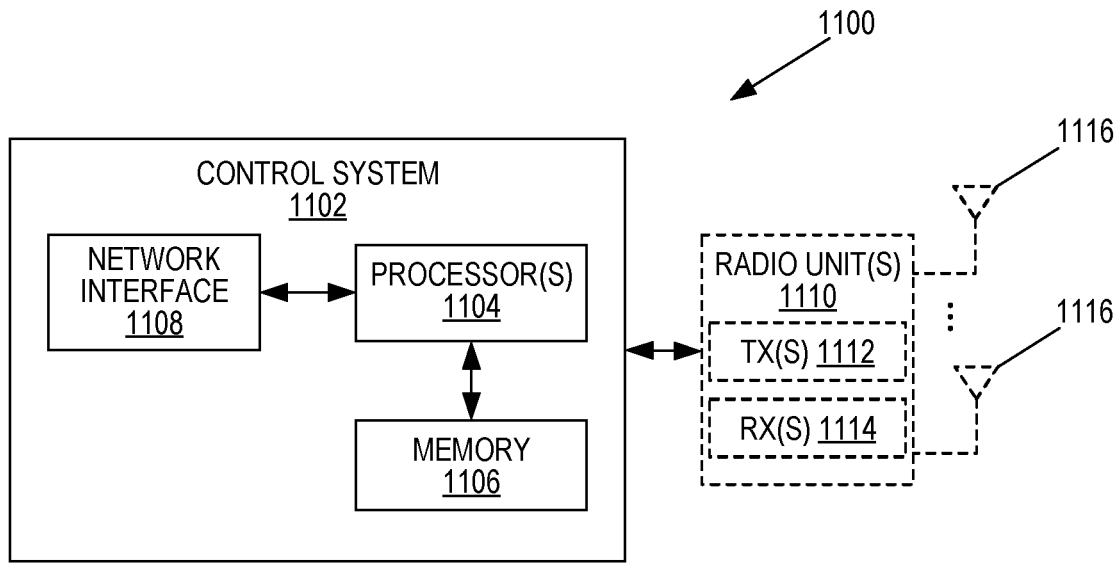
FIG. 11 is a schematic block diagram of a radio access node according to some embodiments of the present disclosure.

FIG. 11 is a schematic block diagram of a radio access node 1100 according to some embodiments of the present disclosure. Optional features are represented by dashed boxes. The radio access node 1100 may be, for example, a base station 302 or 306 or a network node that implements all or part of the functionality of the base station 302 or gNB described herein (e.g., all or part of the functionality of a gNB or base station as described above with respect to Embodiments 1-6 and FIGS. 6-10). As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
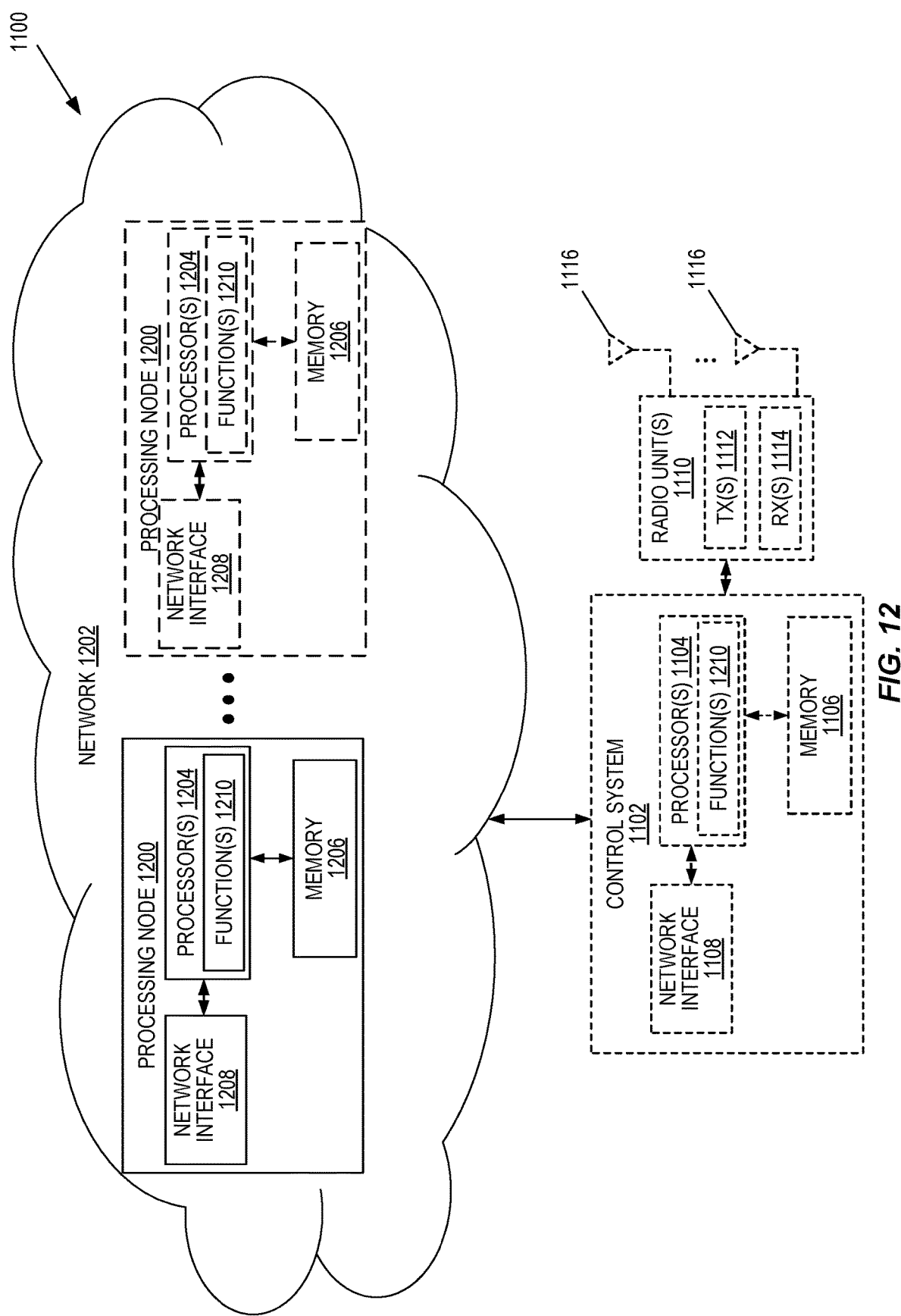
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) 1110 are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., all or part of the functionality of a gNB or base station as described above with respect to Embodiments 1-6 and FIGS. 6-10) are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 (e.g., all or part of the functionality of a gNB or base station as described above with respect to Embodiments 1-6 and FIGS. 6-10) or a node (e.g., a processing node 1200) implementing one or more of the functions 1210 of the radio access node 1100 (e.g., all or part of the functionality of a gNB or base station as described above with respect to Embodiments 1-6 and FIGS. 6-10) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
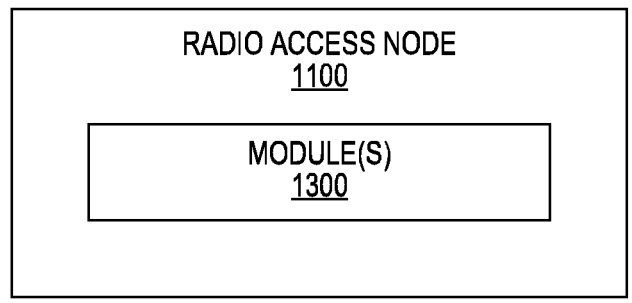
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., all or part of the functionality of a gNB or base station as described above with respect to Embodiments 1-6 and FIGS. 6-10). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
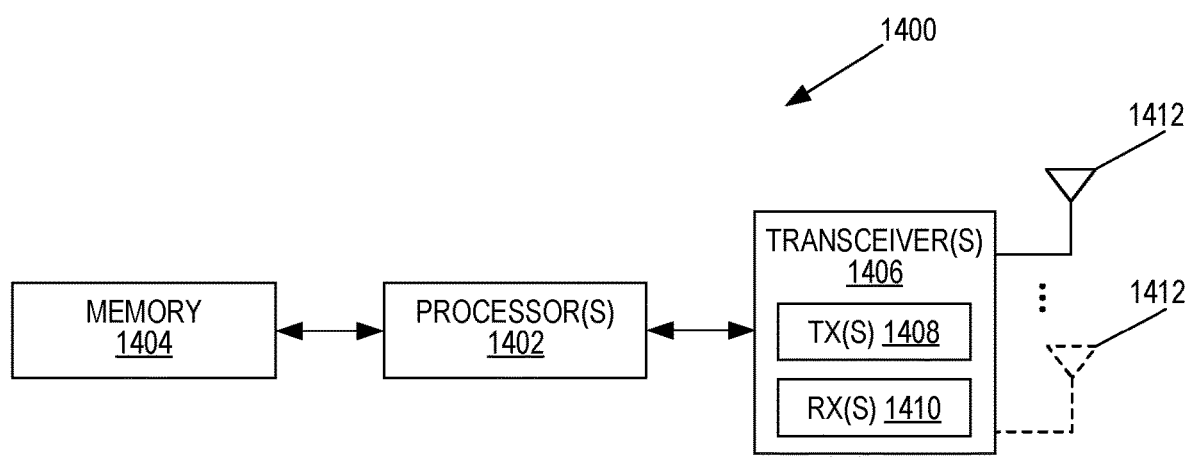
FIG. 14 is a schematic block diagram of a wireless communication device according to some embodiments of the present disclosure.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above (e.g., all or part of the functionality of a UE or wireless communication device as described above with respect to Embodiments 1-6 and FIGS. 6-10) may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein (e.g., all or part of the functionality of a UE or wireless communication device as described above with respect to Embodiments 1-6 and FIGS. 6-10) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
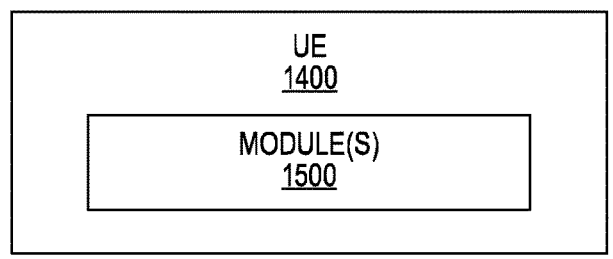
FIG. 15 is a schematic block diagram of the wireless communication device according to some other embodiments of the present disclosure.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein (e.g., all or part of the functionality of a UE or wireless communication device as described above with respect to Embodiments 1-6 and FIGS. 6-10).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless communication device, the method comprising one or more of: receiving (600), from a network node, a channel access mode indication, the channel access mode indication being an indication of whether the wireless communication device is to operate in a Frame-Based Equipment, FBE, channel access mode or a LBE channel access mode; determining (602) a channel access mode in which to operate based on the channel access mode indication; and operating (604) in the determined channel access mode.

Embodiment 2: The method of embodiment 1 wherein the determined channel access mode is the FBE channel access mode, and the method further comprises determining (606) an FFP duration for the FBE mode.

Embodiment 3: The method of embodiment 2 wherein determining (606) the FFP duration comprises determining the FFP duration based on the channel access mode indication.

Embodiment 4: The method of embodiment 3 wherein the channel access mode indication is a joint indication of the channel access mode and, if the indicated channel access mode is the FBE channel access mode, the FFP duration.

Embodiment 5: The method of embodiment 2 wherein the channel access mode indication is a value, and: determining (602) the channel access mode comprises: determining that the channel access mode is the LBE channel access mode if the value is zero; and determining that the channel access mode is the FBE channel access mode if the value is not zero.

Embodiment 6: The method of embodiment 5 wherein determining (606) the FFP duration comprises, if the channel access mode is the FBE channel access mode, determining (606) the FFP duration based on the value of the channel access mode indication.

Embodiment 7: The method of embodiment 1 wherein the determined channel access mode is the FBE channel access mode, and the method further comprises determining (608) a start of one or more FFP cycles for the FBE channel access mode.

Embodiment 8: The method of embodiment 7 wherein determining (608) the start of the one or more FFP cycles for the FBE channel access mode comprises determining (608) the start of the one or more FFP cycles for the FBE channel access mode implicitly.

Embodiment 9: The method of embodiment 8 wherein determining (608) the start of the one or more FFP cycles for the FBE channel access mode implicitly comprises determining that a start of a first FFP cycle is a start of a first symbol of a first slot of SFN=0.

Embodiment 10: The method of embodiment 8 wherein determining (608) the start of the one or more FFP cycles for the FBE channel access mode implicitly comprises determining that a start of a first FFP cycle is at a first occurrence of a SSB in a frame with SFN=0.

Embodiment 11: The method of embodiment 8 wherein determining (608) the start of the one or more FFP cycles for the FBE channel access mode implicitly comprises determining that a start of a first FFP cycle is a start of an earliest monitoring occasion in a Type-0 PDCCH, CSS set where a DCI format with CRC scrambled by a SI-RNTI is received on a cell.

Embodiment 12: The method of embodiment 7 further comprising receiving (602) an indication of the start of an FFP cycle, wherein determining (608) the start of the one or more FFP cycles for the FBE channel access mode implicitly comprises determining (608) the start of the one or more FFP cycles based on the received indication of a start of an FFP cycle.

Embodiment 13: The method of any one of embodiments 1 to 12 wherein the determined channel access mode is the FBE channel access mode, and operating (604) in the determined channel access mode comprises: determining (700) whether a DL transmission is received during a particular FFP cycle; and upon determining (700, YES) that the DL transmission is received during the particular FFP cycle, transmitting (702) a scheduled or configured UL transmission in the same FFP cycle.

Embodiment 14: The method of any one of embodiments 1 to 13 wherein the determined channel access mode is the FBE channel access mode, and operating (604) in the determined channel access mode comprises: performing (800) a CCA check on an operating channel at a start of a particular FFP; upon a result of the CCA check being that the operating channel is clear (802, YES), transmitting (804) a UL transmission during the same FFP (e.g., beginning at the start of the FFP).

Embodiment 15: The method of any one of embodiments 1 to 14 wherein the determined channel access mode is the FBE channel access mode, and operating (604) in the determined channel access mode comprises: determining (1000) whether a DL transmission is detected at a start of a particular FFP cycle; and upon determining (1000, NO) that a DL transmission is not detected at the start of the particular FFP cycle, entering (1002) a sleep or idle mode (e.g., for a reminder of the FFP cycle).

Embodiment 16: The method of any of the previous embodiments, further comprising: providing user data; and forwarding the user data to a host computer via the transmission to the base station.

Group B Embodiments

Embodiment 17: A method performed by network node that implements at least a part of a base station, the method comprising: transmitting or initiating transmission of (600) a channel access mode indication to one or more wireless communication devices, the channel access mode indication being an indication of whether the one or more wireless communication devices are to operate in a FBE channel access mode or a LBE channel access mode.

Embodiment 18: The method of embodiment 17 wherein the channel access mode indication is a joint indication of the channel access mode and, if the indicated channel access mode is the FBE channel access mode, an FFP duration for the FBE channel access mode.

Embodiment 19: The method of embodiment 18 wherein: a value of zero for the channel access mode indication is an indication that the one or more wireless communication devices are to operate in the LBE channel access mode; and a non-zero value for the channel access mode is a joint indication that the one or more wireless communication devices are to operate in the FBE channel access mode and the FFP duration.

Embodiment 20: The method of any of embodiments 17 to 19 further comprising transmitting or initiating transmission of (602), to at least one of the one or more wireless communication devices, an indication of a start of an FFP cycle for the FBE channel access mode.

Embodiment 21: The method of any one of embodiments 17 to 20 wherein the indicated channel access mode is the FBE channel access mode, and the method further comprises: configuring or scheduling (900) UL transmissions for the one or more wireless communication devices such that the UL transmissions align with the start of an FFP; and determining (902) whether a UL transmission is detected at a start of a particular FFP; upon determining (902, YES) that the UL transmission is detected at the start of the particular FFP, transmitting (904) a DL transmission in the same FFP.

Embodiment 22: The method of any of the previous embodiments, further comprising: obtaining user data; and forwarding the user data to a host computer or a wireless communication device.

Group C Embodiments

Embodiment 23: A wireless communication device comprising: processing circuitry configured to perform any of the steps of any of the Group A embodiments; and power supply circuitry configured to supply power to the wireless communication device.

Embodiment 24: A base station comprising: processing circuitry configured to perform any of the steps of any of the Group B embodiments; and power supply circuitry configured to supply power to the base station.

Embodiment 25: A UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 26: A communication system including a host computer comprising: processing circuitry configured to provide user data; and a communication interface configured to forward the user data to a cellular network for transmission to a UE; wherein the cellular network comprises a base station having a radio interface and processing circuitry, the base station's processing circuitry configured to perform any of the steps of any of the Group B embodiments.

Embodiment 27: The communication system of the previous embodiment further including the base station.

Embodiment 28: The communication system of the previous 2 embodiments, further including the UE, wherein the UE is configured to communicate with the base station.

Embodiment 29: The communication system of the previous 3 embodiments, wherein: the processing circuitry of the host computer is configured to execute a host application, thereby providing the user data; and the UE comprises processing circuitry configured to execute a client application associated with the host application.

Embodiment 30: A method implemented in a communication system including a host computer, a base station, and a UE, the method comprising: at the host computer, providing user data; and at the host computer, initiating a transmission carrying the user data to the UE via a cellular network comprising the base station, wherein the base station performs any of the steps of any of the Group B embodiments.

Embodiment 31: The method of the previous embodiment, further comprising, at the base station, transmitting the user data.

Embodiment 32: The method of the previous 2 embodiments, wherein the user data is provided at the host computer by executing a host application, the method further comprising, at the UE, executing a client application associated with the host application.

Embodiment 33: A UE configured to communicate with a base station, the UE comprising a radio interface and processing circuitry configured to perform the method of the previous 3 embodiments.

Embodiment 34: A communication system including a host computer comprising: processing circuitry configured to provide user data; and a communication interface configured to forward user data to a cellular network for transmission to a UE; wherein the UE comprises a radio interface and processing circuitry, the UE's components configured to perform any of the steps of any of the Group A embodiments.

Embodiment 35: The communication system of the previous embodiment, wherein the cellular network further includes a base station configured to communicate with the UE.

Embodiment 36: The communication system of the previous 2 embodiments, wherein: the processing circuitry of the host computer is configured to execute a host application, thereby providing the user data; and the UE's processing circuitry is configured to execute a client application associated with the host application.

Embodiment 37: A method implemented in a communication system including a host computer, a base station, and a UE, the method comprising: at the host computer, providing user data; and at the host computer, initiating a transmission carrying the user data to the UE via a cellular network comprising the base station, wherein the UE performs any of the steps of any of the Group A embodiments.

Embodiment 38: The method of the previous embodiment, further comprising at the UE, receiving the user data from the base station.

Embodiment 39: A communication system including a host computer comprising: communication interface configured to receive user data originating from a transmission from a UE to a base station; wherein the UE comprises a radio interface and processing circuitry, the UE's processing circuitry configured to perform any of the steps of any of the Group A embodiments.

Embodiment 40: The communication system of the previous embodiment, further including the UE.

Embodiment 41: The communication system of the previous 2 embodiments, further including the base station, wherein the base station comprises a radio interface configured to communicate with the UE and a communication interface configured to forward to the host computer the user data carried by a transmission from the UE to the base station.

Embodiment 42: The communication system of the previous 3 embodiments, wherein: the processing circuitry of the host computer is configured to execute a host application; and the UE's processing circuitry is configured to execute a client application associated with the host application, thereby providing the user data.

Embodiment 43: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 44: A method implemented in a communication system including a host computer, a base station, and a UE, the method comprising: at the host computer, receiving user data transmitted to the base station from the UE, wherein the UE performs any of the steps of any of the Group A embodiments.

Embodiment 45: The method of the previous embodiment, further comprising, at the UE, providing the user data to the base station.

Embodiment 46: The method of the previous 2 embodiments, further comprising: at the UE, executing a client application, thereby providing the user data to be transmitted; and at the host computer, executing a host application associated with the client application.

Embodiment 47: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 48: A communication system including a host computer comprising a communication interface configured to receive user data originating from a transmission from a UE to a base station, wherein the base station comprises a radio interface and processing circuitry, the base station's processing circuitry configured to perform any of the steps of any of the Group B embodiments.

Embodiment 49: The communication system of the previous embodiment further including the base station.

Embodiment 50: The communication system of the previous 2 embodiments, further including the UE, wherein the UE is configured to communicate with the base station.

Embodiment 51: The communication system of the previous 3 embodiments, wherein: the processing circuitry of the host computer is configured to execute a host application; and the UE is configured to execute a client application associated with the host application, thereby providing the user data to be received by the host computer.

Embodiment 52: A method implemented in a communication system including a host computer, a base station, and a UE, the method comprising: at the host computer, receiving, from the base station, user data originating from a transmission which the base station has received from the UE, wherein the UE performs any of the steps of any of the Group A embodiments.

Embodiment 53: The method of the previous embodiment, further comprising at the base station, receiving the user data from the UE.

Embodiment 54: The method of the previous 2 embodiments, further comprising at the base station, initiating a transmission of the received user data to the host computer. At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- 5GC Fifth Generation Core
- 5GS Fifth Generation System
- ACK Acknowledgement
- AIFS Arbitration Inter-Frame Space
- AMF Access and Mobility Function
- AP Access Point
- ASIC Application Specific Integrated Circuit
- AUSF Authentication Server Function
- CCA Clear Channel Assessment
- COT Channel Occupancy Time
- CPU Central Processing Unit
- CRC Cyclic Redundancy Check
- CSI-RS Channel State Information Reference Signal
- CSS Common Search Space
- CW Contention Window
- DCI Downlink Control Information
- DL Downlink
- DMRS Demodulation Reference Signal
- DSP Digital Signal Processor
- ED Energy Detection
- EDCA Enhanced Distribution Channel Access
- eNB Enhanced or Evolved Node B
- FBE Frame-Based Equipment
- FFP Fixed Frame Period
- FPGA Field Programmable Gate Array
- GC-PDCCH Group Common Physical Downlink Control Channel
- gNB New Radio Base Station
- gNB-CU New Radio Base Station Central Unit
- gNB-DU New Radio Base Station Distributed Unit
- HARQ Hybrid Automated Repeat Request
- HARQ-ACK Hybrid Automated Repeat Request Acknowledgement
- HSS Home Subscriber Server
- IoT Internet of Things
- LAA License Assisted Access
- LBE Load-Based Equipment
- LBT Listen Before Talk
- LTE Long Term Evolution
- MAC Medium Access Control
- MCOT Maximum Channel Occupancy Time
- MME Mobility Management Entity
- MTC Machine Type Communication
- NEF Network Exposure Function
- NF Network Function
- NG Next Generation
- NR New Radio
- NRF Network Function Repository Function
- NR-U New Radio Unlicensed
- NSSF Network Slice Selection Function
- PBCH Physical Broadcast Channel
- PC Personal Computer
- PCF Policy Control Function
- PDCCH Physical Downlink Control Channel
- PDCCH Physical Downlink Shared Channel
- PHY Physical Layer
- PRACH Physical Random Access Channel
- PUCCH Physical Uplink Control Channel
- PUSCH Physical Uplink Shared Channel
- P-GW Packet Data Network Gateway
- RACH Random Access Channel
- RAM Random Access Memory
- RAN Radio Access Network
- RAT Radio Access Technology
- Rel-16 Release 16
- RO Random Access Channel Occasion
- ROM Read Only Memory
- RRC Radio Resource Control
- RRH Remote Radio Head
- SCEF Service Capability Exposure Function
- SFN System Frame Number
- SIB System Information Block
- SI-RNTI System Information Radio Network Temporary Identifier
- SMF Session Management Function
- SRS Sounding Reference Signal
- SS System Synchronization
- SSB System Synchronization Block
- TR Technical Report
- TRS Tracking Reference Signal
- TXOP Transmission Opportunity
- UDM Unified Data Management
- UL Uplink
- UE User Equipment
- UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless communication device, the method comprising:
    receiving, from a network node, a channel access mode indication, the channel access mode indication being an indication of whether the wireless communication device is to operate in a Frame-Based Equipment (FBE) channel access mode or a Load-Based Equipment (LBE) channel access mode;
    determining a channel access mode in which to operate based on the channel access mode indication, wherein the determined channel access mode is the FBE channel access mode, and operating in the determined channel access mode comprises operating as a responding node by:
        determining whether a Downlink (DL) transmission is received during a particular Fixed Frame Period (FFP); and
        upon determining that the DL transmission is received during the particular FFP, transmitting an Uplink (UL) transmission in the particular FFP; and
    operating in the determined channel access mode.

2. The method of claim 1 wherein the channel access mode indication is broadcast by the network node.

3. The method of claim 2 further comprising receiving a dedicated signal from the network node indicating the channel access mode indication, wherein the channel access mode is determined based on the dedicated signal.

4. The method of claim 1 wherein the method further comprises determining the FFP for the FBE channel access mode.

5. The method of claim 4 wherein determining the FFP comprises determining the FFP based on the channel access mode indication.

6. The method of claim 5 wherein the channel access mode indication is a joint indication of the channel access mode and, if the indicated channel access mode is the FBE channel access mode, the FFP.

7. The method of claim 1 wherein the method further comprises determining a start of one or more FFPs for the FBE channel access mode.

8. The method of claim 1 wherein operating in the determined channel access mode comprises operating as an initiating node by:
performing a Clear Channel Access (CCA) check on an operating channel before a start of a particular FFP; and
upon a result of the CCA check being that the operating channel is clear transmitting an UL transmission during the particular FFP.

9. The method of claim 8 further comprising determining the FFP based on one or more of an indication of FFP and a time domain offset, 0, signaled by the network node.

10. The method of claim 8 wherein operating in the determined channel access mode further comprises operating as the initiating node by calculating the FFP based on a duration of planned initiating transmissions.

11. The method of claim 8 wherein when multiple Random Access Channel (RACH) Occasions (ROs) are configured within a Physical RACH (PRACH) configuration period, operating in the determined channel access mode further comprises operating as the initiating node by selecting one of the multiple ROs at a beginning of the FFP for a first PRACH transmission.

12. A wireless communication device comprising:
processing circuitry configured to cause the wireless communication device to:
receive from a network node, a channel access mode indication, the channel access mode indication being an indication of whether the wireless communication device is to operate in a Frame-Based Equipment (FBE) channel access mode or a Load-Based Equipment (LBE) channel access mode;
determine a channel access mode in which to operate based on the channel access mode indication, wherein the determined channel access mode is the FBE channel access mode, and operating in the determined channel access mode comprises operating as a responding node by:
determining whether a Downlink (DL) transmission is received during a particular Fixed Frame Period (FFP); and
upon determining that the DL transmission is received during the particular FFP, transmitting an Uplink (UL) transmission in the particular FFP; and
operate in the determined channel access mode.

13. A method performed by a network node that implements at least a part of a base station, the method comprising:
transmitting or initiating transmission of a channel access mode indication to one or more wireless communication devices, the channel access mode indication being an indication of whether the one or more wireless communication devices are to operate in a Frame-Based Equipment (FBE) channel access mode or a Load-Based Equipment (LBE) channel access mode, wherein the indicated channel access mode being the FBE channel access mode indicating that the one or more wireless communication devices are to operate as a responding node by:
determining whether a Downlink (DL) transmission is received during a particular Fixed Frame Period (FFP); and
upon determining that the DL transmission is received during the particular FFP, transmitting an Uplink (UL) transmission in the particular FFP.

14. The method of claim 13 wherein the channel access mode indication is a joint indication of a channel access mode and, if the indicated channel access mode is the FBE channel access mode, the FFP for the FBE channel access mode.

15. The method of claim 13 wherein the indicated channel access mode is the FBE channel access mode, and the method further comprises:
configuring or scheduling UL transmissions for the one or more wireless communication devices such that the UL transmissions align with a start of a FFP;
determining whether a UL transmission is detected at a start of a particular FFP; and
upon determining that the UL transmission is detected at the start of the particular FFP, transmitting a DL transmission in the particular FFP.

16. The method of claim 13 further comprising:
configuring a Physical Random Access Channel (PRACH) with multiple Random Access Channel Occasions (ROs); and
aligning a FFP for the FBE channel access mode with the configured PRACH such that at least one of the multiple ROs is at the start of the FFP.

17. A network node comprising:
processing circuitry configured to cause the network node to:
transmit or initiate transmission of a channel access mode indication to one or more wireless communication devices, the channel access mode indication being an indication of whether the one or more wireless communication devices are to operate in a Frame-Based Equipment (FBE) channel access mode or a Load-Based Equipment (LBE) channel access mode, wherein the indicated channel access mode being the FBE channel access mode indicating that the one or more wireless communication devices are to operate as a responding node by:
determining whether a Downlink (DL) transmission is received during a particular Fixed Frame Period (FFP); and
upon determining that the DL transmission is received during the particular FFP, transmitting an Uplink (UL) transmission in the particular FFP.

* * * * *